United States Patent Office 3,380,245
Patented Apr. 30, 1968

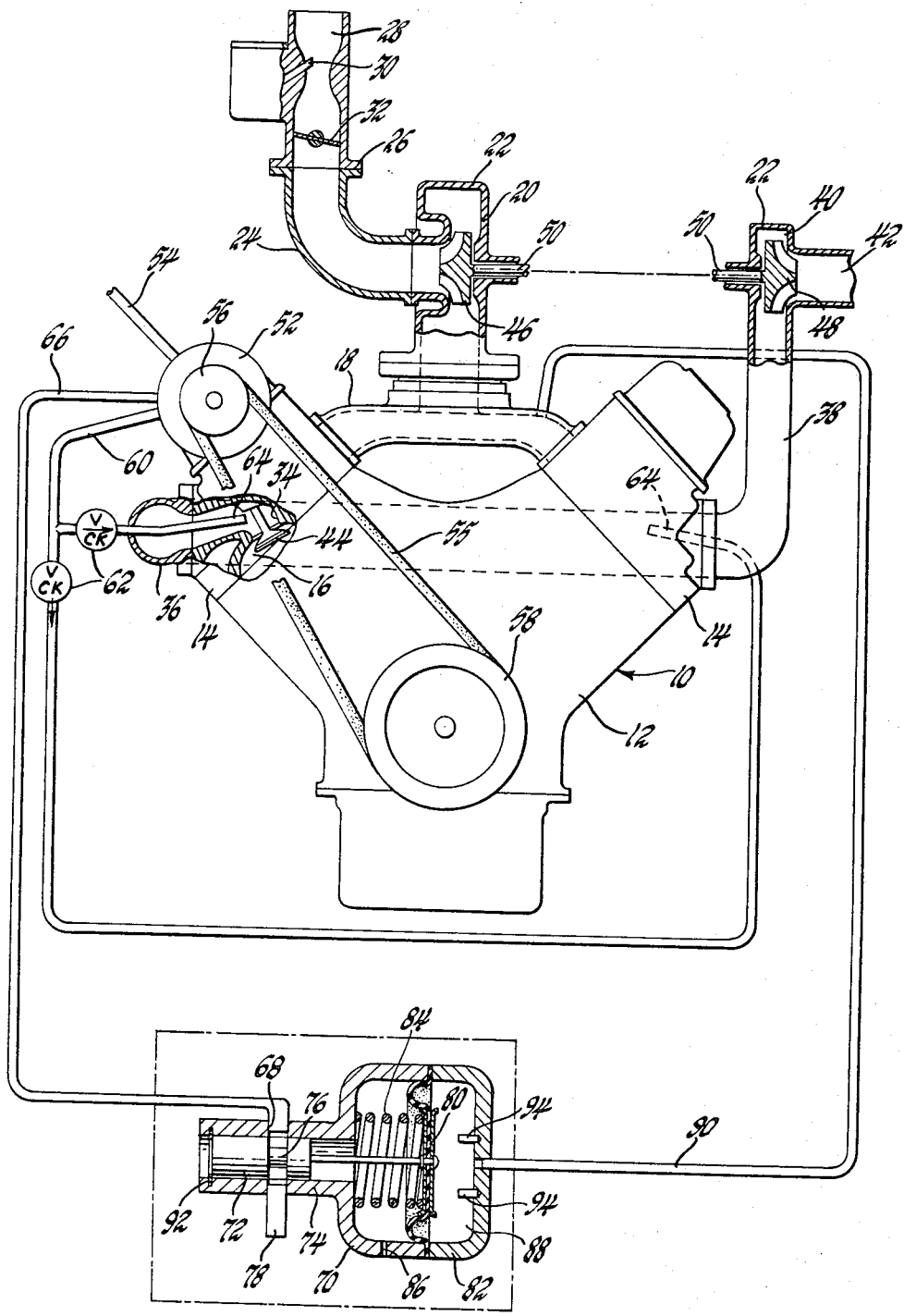

3,380,245
ENGINE WITH EXHAUST DRIVEN SUPERCHARGER AND AFTERBURNER AIR SUPPLY CONTROLS
Stanley H. Mick, St. Clair Shores, Mich., assignor to General Motors Corporation, Detroit, Mich., a corporation of Delaware
Filed Dec. 20, 1965, Ser. No. 515,112
5 Claims. (Cl. 60—13)

This invention relates to internal combustion engines and, more particularly, to internal combustion engines of the type having an exhaust driven supercharger to pressurize the air or fuel/air mixture supplied to the induction system, such engine being equipped with means for injecting air or other combustion supporting fluid into the engine exhaust system upstream of the supercharger turbine, or other driving means, and means for controlling the addition of air in response to pressures in the induction system.

It is known in the art to pressurize the induction system of an internal combustion engine by means of a supercharger which may be wholly or partially driven by the engine exhaust gases, thereby utilizing some of the energy in the exhaust gases, which would otherwise be wasted, to increase the mass of the air/fuel mixture supplied to the engine cylinders by raising the pressure in the engine induction system.

It is also current practice in the manufacture of internal combustion engines for use in certain automotive vehicles, which are not generally supercharged, to include means for introducing air into the exhaust system of the engine, preferably as close to the engine combustion chambers as possible, for the purpose of burning the unburned hydrocarbons and other combustible substances exhausted from the combustion chambers of the engine. Such systems, as are currently being applied, have as a primary purpose the reduction of unburned and partially burned combustible constituents of the exhaust gases leaving a vehicle engine since it is believed that some of these constituents are contributors to the problems of smog prevelant in certain areas of the country.

I have found that the application of such an air injection system to a turbo-supercharged engine causes the engine to operate more efficiently under some conditions, but also may result in excessively high pressures in the engine induction system, thereby causing excessive combustion pressures which may damage components of the engine and, in the case of spark ignition engines, result in higher knock sensitivity or the requirement for higher octane fuels.

These phenomena result from the fact that the afterburning of combustibles in the exhaust system raises the energy of the exhaust gases, causing increased turbo-supercharger speeds and giving higher pressures in the induction system than would be encountered under the same conditions with a non-air injected engine. While it is, of course, desirable to take advantage of the increased efficiency obtained by the application of an air injection system to such turbo-charged engines, it is necessary to provide some means to protect the engine against the excessive induction system pressures which may result under certain conditions.

In order to accomplish this, I purpose to incorporate pressure responsive valve means connecting with the air injection supply means and responsive to pressure in the induction system such that when a desired pressure limit is reached, the valve opens, bleeding off part or all of the injection air supply which would otherwise go into the engine exhaust system. By this means, the advantages of higher efficiency may be retained up to the predetermined limit of induction system pressures at which point reduction or complete elimination of the injection of air into the exhaust system prevents overspeeding of the turbo-supercharger and the development of excessive induction system pressures.

These and other advantages of the invention will be more fully understood by reference to the following description and drawing of a single embodiment of the invention selected for purposes of illustration and in which, referring to the drawing, the single figure illustrates an end elevation of an internal combustion engine embodying the invention and partially broken away to show certain of the components, including induction pressure responsive valve means drawn to an enlarged scale with respect to other portions of the drawing.

Referring more particularly to the drawing, numeral 10 generally indicates an internal combustion engine having a cylinder block 12 including two angularly disposed banks of cylinders closed at their upper ends by a pair of cylinder heads 14 and forming therewith a plurality of combustion chambers 16.

Connecting with the combustion chambers of both banks through passages (not shown) in the cylinder head is an inlet manifold 18 having mounted thereon and connecting with the compressor portion 20 of a turbo-supercharger 22. The inlet of compressor portion 20 connects through an elbow 24 with a carburetor 26 having a conventional air inlet 28, fuel feeding means 30 and throttle plate 32 to control the flow of air/fuel mixture to the engine.

The combustion chambers 16 also connect through exhaust passages 34 in the cylinder head with exhaust manifolds 36 which lead, through exhaust pipe 38, to the turbine portion 40 of turbo-supercharger 22 and beyond to an exhaust outlet 42. Exhaust valves 44 control the flow of combustion products from the combustion chambers 16 to the exhaust system.

It should be noted that the compressor wheel 46 and the turbine wheel 48 of turbo-supercharger 22 are mounted for rotation on a common shaft 50.

The portion of the engine so far described is conventional and operates in the following manner. An air/fuel mixture is formed in carburetor 26 and is drawn, as permitted by the opening of throttle plate 32, through compressor portion 20 and inlet manifold 18 to combustion chambers 16 where it is ignited and burned, driving the engine. The exhaust products are then forced out of the combustion chambers past valves 44 and through passages 34, exhaust manifolds 36 and exhaust pipe 38 to turbine portion 40 where the pressurized gases rotatably drive turbine wheel 48 and pass out through exhaust outlet 42. Turbine wheel 48 drives compressor wheel 46 through shaft 50 thereby increasing the pressure of the air/fuel mixture passing through the inlet manifold into the combustion chambers and permitting the introduction of a greater mass of air and fuel into the chambers during each cycle than would otherwise be possible. By this means, energy in the exhaust gases is utilized to compress the charge, increasing the output and efficiency of operation of the engine.

As part of the novel combination of the present invention, the engine further includes an air injection system comprising a positive displacement pump 52 having an inlet tube 54 connectable to a source of clean air. The pump is rotatably driven through a belt 55 extending between driven pulley 56 on the pump and drive pulley 58 on the end of the engine crankshaft. A distribution conduit 60 connects with the pump outlet and divides into two branches each having a check valve 62 and terminating in a plurality of runner portions 64 extending through the exhaust manifolds 36, into each passage 34 and terminating adjacent the exhaust valve 44.

A bypass conduit 66 also connects at one end to the outlet of pump 52 and connects at its outer end to the inlet 68 of a control valve housing 70. A spool valve 72 is slidable in a cylindrical portion 74 of the valve housing includes a necked down portion 76 which, when aligned with opening 68 as shown in the drawings, connects the conduit 66 with an outlet nipple 78 which is open to atmosphere. Spool valve 72 is connected to a diaphragm actuator 80 mounted in an enlarged portion 82 of the valve housing and includes a coil spring 84 biasing the diaphragm actuator 80 rightwardly, as shown in the drawing, so as to urge the spool valve 72 in a closing direction. The spring side of the diaphragm is open to atmospheric pressure through an opening 86 in the housing. On its opposite side, diaphragm 80 is exposed to inlet manifold pressure acting in chamber 88 by connection through conduit 90 with the inlet manifold 18. Snap ring 92 and stop pins 94 are included to limit movement of the spool valve 72 in the opening and closing directions, respectively.

The portions of the construction last described operate as follows. Rotation of the pump by the engine draws air into inlet 54 and distributes it through conduit 60 to runner portions 64 from whence it is expelled into exhaust passages 34 adjacent the exhaust valves. The air mixing with the hot exhaust gases causes the unburned hydrocarbons and other combustible substances which were not completely burned in the combustion chamber to undergo further burning in the exhaust system of the engine. This further burning reduces the quantity of undesirable combustibles present in the exhaust gases and, additionally, increases the energy level of the exhaust gases. Due to the increased energy level, as represented by higher pressure and flow rate of the gases, the turbine 48 is turned at an increased speed which, in turn, increases the speed of compressor 46, causing an increase in pressure of the charge in the engine induction system downstream of the compressor with a resultant increase in the efficiency of operation of the engine.

When a predetermined pressure level is reached in inlet manifold 18, the pressure therein, acting in chamber 82 of the control valve, forces diaphragm 80 leftwardly against the bias of spring 84, causing the spool valve 72 to open and connect the outlet of pump 52 with atmosphere. Depending on the degree of opening of the spool valve, this permits a greater or less portion of the air output of the pump 52 to be bled directly to atmosphere, reducing the amount of air injected into the exhaust system and preventing any further increase in the energy level of the exhaust gases due to air injection. By this means, the control valve 70 automatically limits the amount of air injected and thereby controls the pressure in the inlet manifold portion of the induction system at or near a desired maximum pressure.

It is to be understood that while the invention has been presented by reference to a single embodiment chosen for purposes of illustration, numerous changes or modifications could be made within the spirit and scope of the invention and the invention is intended to be limited only by the language of the following claims.

I claim:
1. An internal combustion engine having a combustion chamber,
   a fluid induction system to feed the combustion chamber,
   an exhaust system to carry exhaust fluid from the combustion chamber and
   a supercharger connected with both the induction and exhaust systems and adapted to utilize energy in the exhaust fluid to increase the pressure of fluid in the induction system
   wherein the improvement comprises
   fluid supply means including a fluid pump separate from the supercharger and having an outlet connected with the exhaust system between the combustion chamber and the supercharger and adapted to supply combustion supporting fluid to react with combustible substances discharged from the combustion chamber as part of the exhaust fluid and thereby increase the exhaust energy available to the supercharger, said supply means being responsive to predetermined maximum fluid pressures in the induction system to limit the supply of combustion supporting fluid to the exhaust system, whereby creation of excessive pressures in the induction system by the supercharger is avoided.

2. The combination of claim 1 wherein said fluid supply means further comprises
   valve means connected with the pump outlet and having actuating means connected with the engine induction system and responsive to predetermined maximum pressures therein to open said valve means and permit fluid supplied by the pump to bypass the engine exhaust system.

3. The combination of claim 2 wherein said pump outlet is connected with the exhaust system such that the combustion supporting fluid is introduced to the exhaust system closely downstream from the combustion chamber whereby the burning of combustible substances exhausted from the combustion chamber is efficiently accomplished.

4. The combination of claim 3 wherein said fluid pump is engine driven at speeds proportional to the speeds of the engine and the fluid output of said pump is generally proportioned to its speeds, said valve means being variably openable in response to varying pressure in said induction system above a predetermined minimum to permit the bypassing of variable quantities of pump supplied fluid.

5. The combustion of claim 1 wherein said engine includes
   an exhaust passage opening into said combustion chamber and
   exhaust valve means controlling communication of the exhaust passage and combustion chamber,
   said fluid pump is engine driven and includes an inlet connected with a source of combustible fluid
   and said fluid supply means further comprises
   conduit means connected with said pump outlet and opening into the exhaust passage adjacent the exhaust valve means to conduct fluid supplied by said pump to the exhaust system closely downstream from the combustion chamber,
   control valve means connected with said pump outlet and openable to permit pump-supplied fluid to bypass said exhaust system and
   actuating means operably connected with said control valve means, said actuating means being connected with said induction system and responsive to pressures therein above a predetermined minimum pressure to open said contol valve means, the degree of such opening being related in a predetermined manner to the pressure in said induction system.

References Cited

UNITED STATES PATENTS

| | | | |
|---|---|---|---|
| 2,608,818 | 9/1952 | Shelley | 60—13 |
| 2,654,991 | 10/1953 | Nettel | 60—13 |
| 3,060,678 | 10/1962 | Ridgway | 60—30 |

FOREIGN PATENTS 1,012,365  4/1952  France.

CARLTON R. CROYLE, *Primary Examiner.*

MARK NEWMAN, *Examiner.*

D. HART, *Assistant Examiner.*